United States Patent
Green, Jr.

[15] 3,648,357
[45] Mar. 14, 1972

[54] METHOD FOR SEALING MICROELECTRONIC DEVICE PACKAGES

[72] Inventor: Harry J. Green, Jr., Monroe County, N.Y.
[73] Assignee: General Dynamics Corporation
[22] Filed: July 31, 1969
[21] Appl. No.: 846,414

[52] U.S. Cl. ..................................29/492, 29/497, 29/498, 29/502, 29/504, 29/588, 29/627
[51] Int. Cl. ............................................B23k 31/02
[58] Field of Search..............29/473.1, 492, 497, 498, 502, 29/504, 588, 627, 494

[56] References Cited

UNITED STATES PATENTS

| | | | |
|---|---|---|---|
| 2,835,967 | 5/1958 | Umblia | 29/494 X |
| 3,031,747 | 5/1962 | Green | 29/473.1 |
| 3,141,226 | 7/1964 | Bender et al. | 29/588 |
| 3,202,489 | 8/1965 | Bender et al. | 29/498 X |
| 3,246,384 | 4/1966 | Vice | 29/502 X |
| 3,298,093 | 1/1967 | Cohen | 29/473.1 |
| 3,396,454 | 8/1968 | Murdock et al. | 29/497 X |
| 3,340,602 | 9/1967 | Hortz | 29/498 X |

Primary Examiner—Charlie T. Moon
Assistant Examiner—Ronald J. Shore
Attorney—Martin Lukacher

[57] ABSTRACT

A method of hermetically sealing flat pack containers having Kovar cans and covers which are gold plated on their sealing surfaces is described. The containers are first vacuum pretinned with an eutectic gold-tin solder so as to dissolve a constant amount of gold from the gold plated sealing surfaces. The containers and covers thus prepared are then juxtaposed at their sealing surfaces and fused together to hermetically seal the containers. Microelectronic devices are assembled within the container before the pretinned layers are fused together.

6 Claims, 8 Drawing Figures

PATENTED MAR 14 1972

INVENTOR.
HARRY J. GREEN
BY m. Lu Kocher

HIS ATTORNEY

METHOD FOR SEALING MICROELECTRONIC DEVICE PACKAGES

The present invention relates to methods for sealing and particularly to an improved method of sealing a container for microelectronic devices such as thin film circuit elements and the like.

While the invention is especially suitable for use in sealing containers, such as flatpacks, which contain microelectronic circuit devices, aspects of the invention are generally applicable for providing reliable seals or joints between elements of various types.

One method of sealing a package for a microelectronic device which has been extensively employed in the industry is to place a solder preform between the periphery of the edges of the housing and the cover to be sealed together. The subassembly is then placed in a sealing machine and is heated to a sufficient temperature to cause the solder to fuse on to the cover and housing. Unfortunately, imperfect hermetic seals result in a substantial portion of the packages so sealed. Not only may leaks in the seal result due to voids therein, but the temperatures necessary to melt the solder and form the seal may be sufficient to damage the microelectronic device contained in the package. Often times the molten solder spatters inside the package and interferes with the proper operation of the circuit. Exceptional care must also be taken to ensure that the preform and the surfaces to be sealed are perfectly clean to avoid blisters and improper seals.

It is therefore an object of the present invention to provide an improved method for hermetically sealing a container.

It is a still further object of the present invention to provide an improved method of sealing containers, such as flatpacks for microelectronic devices.

It is a still further object of the present invention to provide an improved method of sealing containers for microelectronic devices in which special precautions for cleaning parts to be sealed and for the storage of the parts prior to sealing are substantially eliminated.

It is a still further object of the present invention to provide an improved method of sealing microelectronic devices within containers which provide devices having higher reliability and wherein rejects caused by the sealing process are substantially eliminated.

Briefly described, a method of sealing a container such as the package for a microelectronic device in accordance with the invention utilizes containers, the surfaces of which to be sealed have a coating of gold thereon. Each part of the container to be sealed, say the housing and the cover therefor, are pre-tinned in the areas thereof to be sealed by partially dissolving the gold coating into a eutectic gold-tin solder preform. Desirably the coating is dissolved at a temperature equal to the melting point of an alloy containing a slightly greater percentage of gold than initially contained in the eutectic solder itself. This temperature will be slightly higher than the eutectic point of the solder itself and is maintained for a period of time sufficient for the alloy to reach an equilibrium state such that the constant desired amount of gold is contained in the pre-tinned layers formed on the surfaces to be sealed. It has been found especially desirable to perform the pre-tinning under vacuum so that any gases in the solder and gases adsorbed on the gold surface are substantially removed. The microelectronic device, if to be contained in the package is then assembled therein. Finally the pre-tinned layers are juxtaposed with each other and fused together to perform the hermetic seal. This latter fusing step may take place at a temperature below that which would damage the microelectronic device.

The invention itself, both as to its organization and method of operation, as well as additional objects and advantages thereof will become more readily apparent from a reading of the accompanying drawings in which.

Figure 1A:
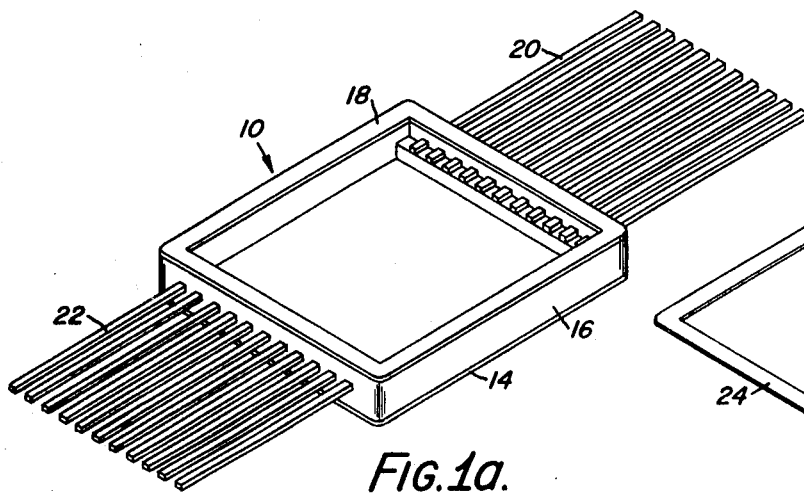
FIGS. 1a, 1b and 1c are perspective views of the parts of a microelectronic flatpack package which are used in the process provided in accordance with an embodiment of the invention.

The package or container for a microelectronic device comprising a housing 10, as shown in FIG. 1a, and a cover 12. The housing may be a rectangular enclosure made up of a bottom plate made of Kovar (a nickel, cobalt and iron alloy) which is fused to glass side walls 16. A rectangular rim 18 of Kovar is also fused to the glass side walls along the upper edge thereof. Leads 20 and 22 for connection to a microelectronic device which is to be disposed in the housing 10 are also fused to the glass side walls. The leads 20 and 22 may also be of Kovar. The housing is then plated with gold. It is a feature of this invention that the gold plating, at least along the upper surface of the rim which will later be at one side of the seal to be formed, be relatively thick, say from 250 to 400 microinches thick.

Figure 1B:
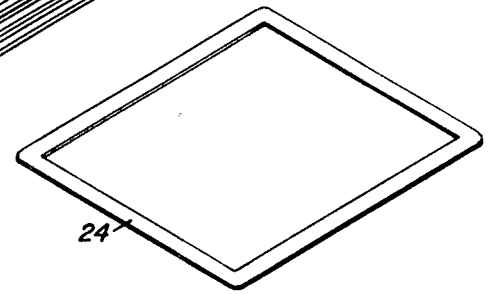
Figure 1C:
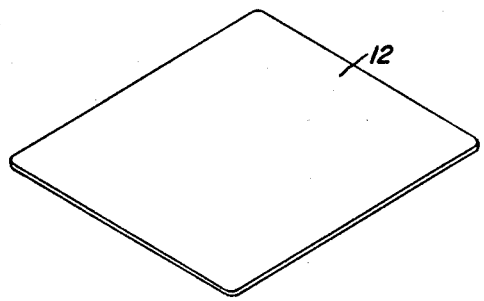

FIG. 1b shows a rectangular preform 24 of eutectic gold-tin solder. This solder will be 80 percent gold and 20 percent tin at the eutectic point. The preform has the same dimensions as the upper surface of the rim and may, for example, be about 0.0015 inch thick. The cover 12 is also of Kovar and gold plated. The thickness of the gold plating on the side thereof which is to provide the seal, or at least on the edges or surface area to be sealed, is desirably thick; having the same thickness mentioned above in connection with the rim 18. Two preforms, one of which is shown in FIG. 1b, are provided. One is used for pre-tinning the rim 18, while the other is used to pre-tin the edge surface area of the cover which is to form the seal.

Figure 2B:
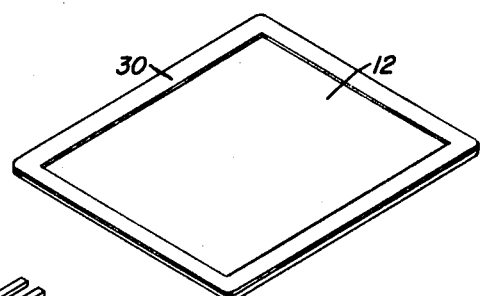
FIGS. 2a and 2b are perspective views of the parts shown in FIGS. 1a, 1b and 1c at an intermediate stage in the process.
Figure 2A:
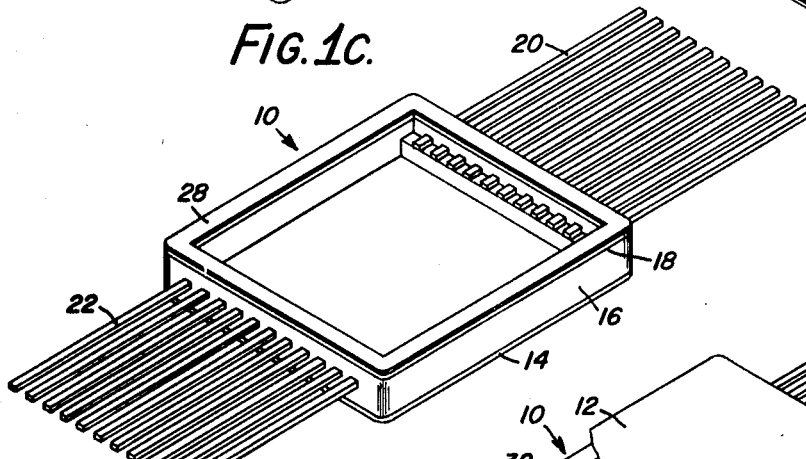

FIG. 2a illustrates the housing after the pre-tinning operation. The housing has a layer or coating 28 of gold-tin solder thereon all along the surface of the rim 18. The cover is illustrated in FIG. 2b. The cover is also subject to the pre-tinning operation, and when pre-tinned has a rim 30 of gold-tin solder over the surface area thereof which is to form the seal.

Pre-tinning is accomplished by equilibrium tinning by which is meant that the gold-tin solder used in tinning dissolves a portion, but not all of the gold plated sealing surfaces, and at a definite temperature at which the pre-tinning is accomplished a constant percentage of gold is present in the molten solder. This is in excess of the percentage of gold initially in the solder.

Figure 5:
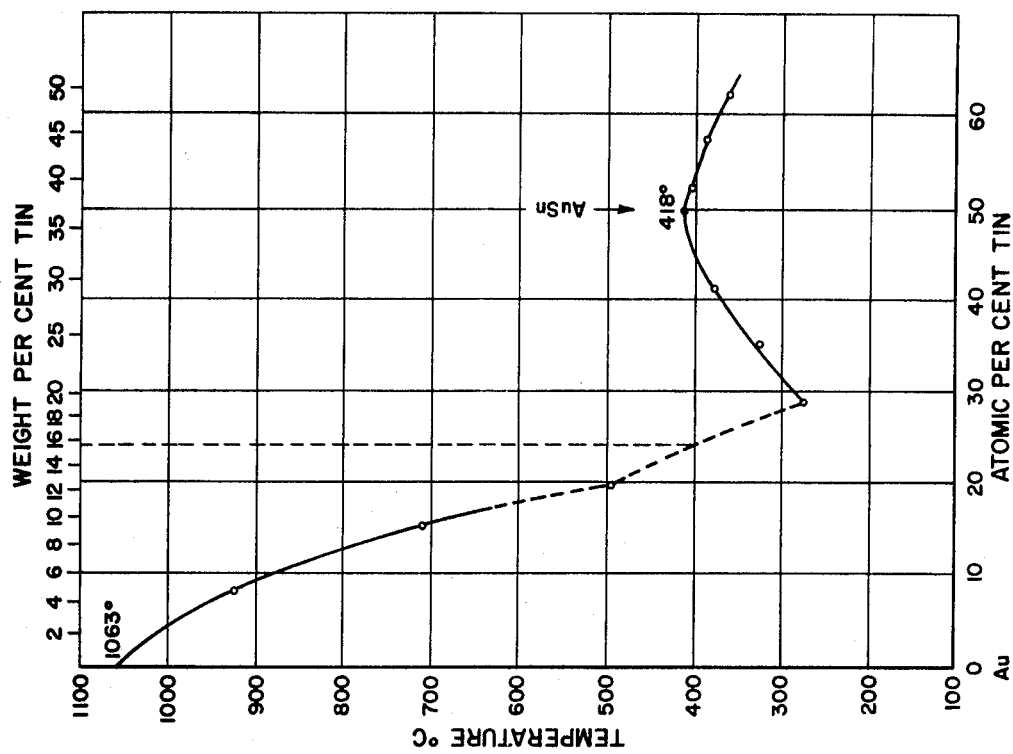
FIG. 5 is a phase diagram of the gold-tin solder used in practicing the invention.

Reference is made to the phase diagram of FIG. 5. The left hand side of the diagram represents 100 percent gold in the alloy. The diagram is cut off at the 50 percent tin point to simplify the illustration. Further details as to the diagram and to the utilization thereof will be found in the text "Constitution of Binary Alloys" by Max Hansen, 2nd edition (1958), published by the McGraw-Hill Book Company of New York City, N.Y. (see p. 233). Consider the following calculations which are based on 1 square centimeter area and a thickness of eutectic solder of 0.0015 inch = 0.0038 centimeter and a thickness of gold dissolved of 0.000250 inch = 0.000635 centimeter. The density of 80 percent gold, 20 percent tin eutectic is 12.2 grams per cubic centimeter. The density of pure gold is 19.3 grams per cubic centimeter. Since we assumed a temperature that would dissolve 0.000635 centimeter of gold we will have a new alloy of gold-tin formed. The composition of this alloy can be calculated as follows:

wt. of gold-tin preform per 1 square centimeter $\times$ 0.0038 centimeter thickness = $1 \times 0.0038 \times 12.2 = 0.0464$ gram wt. of tin in this preform = $0.0464 \times 0.20 = 0.00928$ gram wt. of gold in this preform = $0.0464 \times 0.80 = 0.0371$ gram Now the wt. of gold in the 1 square centimeter $\times$ 0.000635 centimeter of gold plate is $1 \times 0.000635 \times 19.3 = 0.0123$ gram The new alloy formed will then consist of 0.00092 gram of tin and 0.0371 gram plus 0.0123 gram equals 0.0494 gram of gold. The new composition becomes, % gold = 0.0494/(0.0494+0.00928)×100=84.2
% tin = 100−84.2=15.8

Referring to the phase diagram (FIG. 5), and assume that equilibrium conditions obtain, it will be noted that the melting point of the new composition is about 400° C. This is the melting point of the sealing surface. In accordance with the invention, a lower melting point is used, 330° C. having been found to be suitable. This assures that at equilibrium only a portion of the gold in the plated coating will be dissolved into the solder.

Equilibrium alloying, in order to assume that equilibrium is reached, desirably is accomplished over a relatively long period of time, say about 2 hours.

For a specific example, a flatpack package having an outside dimension of 1.05 inches by 0.940 inch and a width of the rim 18 of 0.04 inch. The solder preforms 24, of 0.0015 thickness and the same linear dimensions as the rim 18, are placed individually on the rim 18 and on the sealing area of the cover 12. The rim 18 and cover have a gold plating 400 microinches thick. The value of 400 microinches appears high but this insures no rejects that could be caused by having all of the gold to dissolve. If this happened we would no longer have a simple two-component system as elements from the Kovar would react. The assembled parts are then placed in an oven. This oven is desirably a vacuum oven in which vacuum of approximately $5 \times 10^{-6}$ millimeter of mercury is drawn. The vacuum is drawn over an initial period of say ½ hour. Heat is then applied and the package maintained at a temperature of 330° C. under vacuum ($5 \times 10^{-6}$ Torr) for 2 hours. Thereafter, the oven is allowed to cool, say for several hours until the solder reaches a solid state. Thereafter, the vacuum is removed and the pre-tinned parts, as shown in FIGS. 2a and 2b are ready for further sealing operations. No special precautions are necessary prior to sealing. It is desirable, however, that the surface areas to be sealed be degreased prior to sealing so as to remove and clean any fingerprints or other foreign material therefrom.

Figure 4:
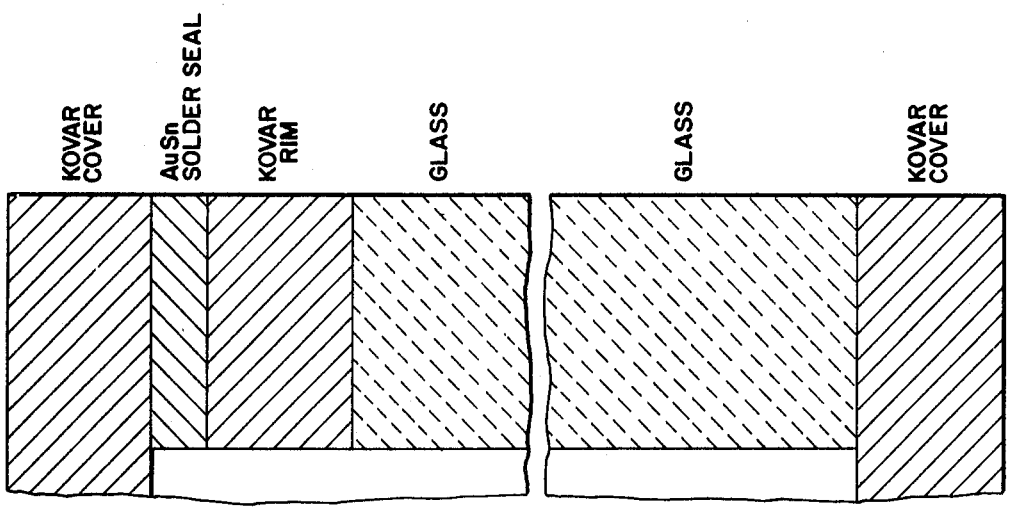
FIG. 4 is a magnified sectional view, the section being taken along the line 4—4 of FIG. 3.

By virtue of the vacuum and the equilibrium pre-tinning operation, a clean void-free structure is provided after sealing. This structure is shown and the absence of voids, say due to gas expansion trapped in the solder or to gases originally adsorbed on the gold surfaces, as may normally occur with conventional sealing techniques, is apparent from FIG. 4.

Figure 3:
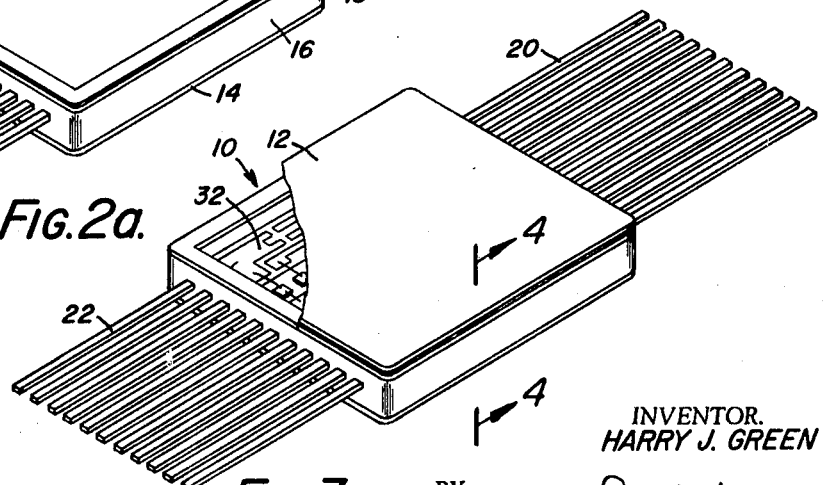
FIG. 3 is a perspective view partly, broken away, of an assembled microelectronic device package, the package having been sealed in accordance with the process provided by the invention.

FIG. 3 illustrates the sealed flatpack. the microelectronic device 32 is shown therein with the leads 20 and 22 connected to appropriate circuit contacts on the device 32.

The sealing operation may be performed by conventional techniques. A sealing machine, such as the flatpack perimeter sealer, sold by the Dix Engineering Services Company of Costa Mesa, California will be suitable. This type of sealing machine and its operation is generally described in U.S. Pat. No. 3,383,454, issued May 14, 1968 to Sidney Dix. As noted above, sealing may be accomplished at relatively low wattage input without adversely affecting the microelectronic device 32. This is because a solder to solder seal is made, and rapid heat transfer may be accomplished. Solder balls and spattering are completely eliminated during the sealing operation and a clean hermetic seal is formed.

Additional advantages of the process are elimination of alignment criticality prior to sealing, greater process control by the facility to observe the pre-tinned areas for any voids or contamination which might adversely affect sealing, reduction in the power and heat required during sealing and lack of any special precautions for handling of parts or storing of parts prior to sealing.

From the foregoing description, it will be apparent that there has been provided an improved method of manufacturing microelectronic devices which is generally applicable for sealing such devices, as well as to sealing containers of varying various kinds, particularly those which must be hermetically sealed. While embodiment of the process and specific example thereof have been given in order to illustrate the invention, it will be apparent that variations and modifications of the herein described method and parts used therein within the spirit of the invention will undoubtedly suggest themselves to those skilled in the art. Accordingly, the foregoing description should be taken as illustrative and not in any limiting sense.

I claim:

1. A method of sealing a container, the surfaces to be sealed having a coating of gold thereon, said method comprising the steps of
    a. partially dissolving said coating into an eutectic gold-tin alloy solder by heating to a temperature slightly higher than the eutectic point temperature of said solder and maintaining said temperature until equilibrium is reached to pre-tin said surfaces in the areas thereof to be sealed by providing a layer of said solder on each of said surfaces having a greater amount of gold therein than initially in said alloy, said temperature being slightly lower than the melting point of an alloy containing all of the gold in said coating, all of the gold initially in said solder and all of the tin in said solder.
    b. placing said surfaces together so that said layer on each surface contact each other, and
    c. fusing said layers to each other whereby to seal said container.

2. The invention as set forth in claim 1 wherein said dissolving step is accomplished in a vacuum whereby to outgas the solder and said gold coating while they are being alloyed.

3. A method of sealing a package for containing a microelectronic device, said package including a housing having a bottom plate and side walls, and a cover, the bottom edges of said walls being attached to said bottom plate, the upper edges of said side walls having a coating of gold thereon, and at least the surface area of said cover to be sealed to said upper edges also having a coating of gold thereon, said method comprising the steps of
    a. providing a pair of preforms of eutectic gold-tin solder having a configuration corresponding to the configuration of said edges,
    b. placing said preforms individually in juxtaposition with said upper edges and upon said surface areas of said cover,
    c. heating under a vacuum said juxtaposed preform and cover and said juxtaposed preform and housing to a temperature melting point of an alloy containing all of the tin in said preform and all the gold in said solder and a portion of the gold in said coatings, and maintaining said temperature for a sufficient period of time until equilibrium is reached so that said coatings partially dissolve with a constant percentage of gold slightly greater than the percentage initially in said solder results after equilibrium is reached whereby to pre-tin said edges and cover areas to be sealed,
    d. placing said housing and cover together so that said pre-tinned areas are in juxtaposition with each other, and
    e. fusing said pre-tinned areas together so as to seal said package.

4. The invention as set forth in claim 3 including the step of assembling said microelectronic device in said housing prior to said fusing step.

5. The invention as set forth in claim 3 wherein said side walls and cover are Kovar and said gold coating is plated upon said upper edges and said surface areas of said cover.

6. The invention as set forth in claim 3 wherein said solder has 80 percent gold and 20 percent tin at its eutectic point, and wherein said coatings are at least 400 micro inch thick, and said melting temperature is about 330° C.

* * * * *